(12) United States Patent
Allison et al.

(10) Patent No.: US 7,546,158 B2
(45) Date of Patent: Jun. 9, 2009

(54) COMMUNICATION METHODS BASED ON BRAIN COMPUTER INTERFACES

(75) Inventors: Brendan Z. Allison, Atlanta, GA (US); Jaime A. Pineda, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 531 days.

(21) Appl. No.: 10/863,587

(22) Filed: Jun. 7, 2004

(65) Prior Publication Data

US 2005/0017870 A1 Jan. 27, 2005

Related U.S. Application Data

(60) Provisional application No. 60/476,507, filed on Jun. 5, 2003.

(51) Int. Cl.
*A61B 5/04* (2006.01)
(52) U.S. Cl. .......................... 600/544; 60/545
(58) Field of Classification Search ................. 600/544, 600/545
See application file for complete search history.

(56) References Cited

U.S. PATENT DOCUMENTS

| | | | |
|---|---|---|---|
| 4,158,196 A | | 6/1979 | Crawford, Jr. |
| 4,651,145 A | * | 3/1987 | Sutter .......................... 345/156 |
| 4,736,751 A | * | 4/1988 | Gevins et al. ............... 600/545 |
| 4,800,893 A | | 1/1989 | Ross et al. |
| 4,926,969 A | * | 5/1990 | Wright et al. ................ 600/544 |
| 5,392,788 A | * | 2/1995 | Hudspeth ..................... 600/544 |
| 5,638,826 A | | 6/1997 | Wolpaw et al. |
| 5,788,648 A | * | 8/1998 | Nadel .......................... 600/544 |
| 5,844,544 A | | 12/1998 | Kahn et al. |
| 5,967,996 A | * | 10/1999 | Kadota et al. ................ 600/544 |
| 6,001,065 A | | 12/1999 | DeVito |
| 6,903,723 B1 | * | 6/2005 | Forest ......................... 345/157 |
| 7,113,170 B2 | * | 9/2006 | Lauper et al. ................ 345/158 |
| 7,123,955 B1 | * | 10/2006 | Gao et al. .................... 600/544 |
| 2005/0283090 A1 | * | 12/2005 | Wells .......................... 600/544 |

OTHER PUBLICATIONS

Jung TP, Makeig S, Westerfield M, Townsend J, Courchesne E, Sejnowski TJ (2001): Analysis and Visualization of Single-Trial Event-Related Potentials. Human Brain Mapping 14:166-185.*

L.A. Farwell et al., "Talking off the top of your head: toward a mental prosthesis utilizing event-related brain potentials", Electroencephalography and clinical Neurophysiology, 1988, 70: 510-523, Elsevier Scientific Publishers Ireland. Ltd.

J.R. Wolpaw et al., "Brain-Computer Interfaces for Communication and Control", Clinical Neurophysiology 113 (2002) 767-791.

(Continued)

*Primary Examiner*—Robert L Nasser
*Assistant Examiner*—Karen E Toth
(74) *Attorney, Agent, or Firm*—Fish & Richardson P.C.

(57) ABSTRACT

A method of providing an interface between a brain and a data processor may include generating stimuli and detecting one or more signals indicative of brain activity. The one or more signals may be processed, and a portion indicating attention to stimulus may be used to determine an attended-to symbol.

37 Claims, 10 Drawing Sheets

OTHER PUBLICATIONS

K.R. Shenoy et al., "Neural Prosthetic Control Signals from Plan Activity" NeuroReport, Motor Systems, vol. 14, No. 4, Mar. 24, 2003.

C. Guger et al., "Real-Time EEG Analysis with Subject-Specific Spatial Patterns for a Brain-Computer Interface (BCI)", IEEE Transactions on Rehabilitation Engineering, vol. 8, No. 4, Dec. 2000.

M. Pregenzer et al., "Frequency Component Selection for an EEG-Based Brain to Computer Interface", IEEE Transactions on Rehabilitation Engineering, vol. 7, No. 4, Dec. 1999.

D.J. McFarland et al., "Brain-Computer Interface (BCI) Operation: Optimizing Information Transfer Rates" Biological Psychology 63 (2003) 237-251.

J.R. Wolpaw et al., "An EEG-Based Brain-Computer Interface for Cursor Control", Electroencephalography and clinical Neurophysiology, 1991, 78: 252-259.

Allison, B.Z. and J.A. Pineda, "ERPs Evoked by Different Matrix Sizes: Implications for a Brain Computer Interface (BCI) System", IEEE Transactions on Neural Systems and Rehabilitation Engineering, vol. 11, No. 2, pp. 110-113 (Jun. 2003).

Allison, B.Z. et al., "Toward a faster, better BCI," Soc. Neurosci. Abstt. vol. 27, Part 2, p. 1969, Abstract No. :741.13 (2001).

Bossetti, C.A. et al., "Transmission Latencies in a Telemetry-Linked Brain-Machine Interface", IEEE Transactions on Biomedical Engineering, vol. 52, No. 6, pp. 919-924 (Jun. 2004).

Donchin, E. et al., "The mental prosthesis: assessing the speed of a P300-based brain-computer interface," IEEE Transactions on Rehabilitation Enigneering vol. 8, No. 2, pp. 174-179 (Jun. 2000).

Hinterberger, T. et al., "A brain-computer interface (BCI) for the locked-in: comparison of different EEG classifications for the thought translation device," Clinical Neurophysiology 114(3): 416-425 (2003).

Kelly, S.P. et al., "EEG-Based Brain Computer Interface Control in an Immersive 3-D Gaming Environment", http://ee.ucd.ie/~rreilly/elevation/KellyIEI.pdf [accessed Sep. 4, 2008], 6 pages.

Krepki, R. et al., "The Berlin Brain-Computer Interface (BBCI) towards a new communication channel for online control of multimedia applications and computer games" 9th International Conference on Distributed Multimedia Systems (DMS'03), pp. 237-244, 2003.

Pineda, J.A. et al., "Learning to Control Brain Rhythms: making a Brain-Computer Interface Possible," IEEE transactions on Neural Systems and Rehabilitation Engineering, vol. 11, No. 2, pp. 181-184 (Jun. 2003).

Pineda, J.A. et al., The Effects of Self-Movement, Observations, and Imagination on Mu Rhythms and Readiness Potentials (RPs): Towards a Brain-Computer Interface (BCI), IEEE Transactions on Rehabilitation Engineering, vol. 8, No. 2 pp. 219-222 (Jun. 2000).

Polikoff, J.B. et al., "Toward a P-300 based computer interface," Proceedings of the RESNA '95 Annual Conference, Vancouver, BC, Canada, Jun. 9-14, 1995, RESNAPRESS, Arlington Va. pp. 678-680 (1995).

Pineda, J.A., et al., The Effects of Self-Movement, Observation, and Imagination on Mu Rhythms and Readiness Potentials (RPs): Towards a Brain-Computer Interface (BCI), IEEE Transactions on Rehabilitation Engineering, vol. 8, No. 2 pp. 219-222 (Jun. 2000).

Allison, B.Z. and J.A. Pineda, "ERPs Evoked by Different Matrix Sizes: Implications for a Brain Computer Interface (BCI) System", IEEE transactions on Neural Systems and Rehabilitation Engineering, vol. 11, No. 2, pp. 110-113 (Jun. 2003).

L.A. Farwell et al., "Talking off the top of your head: toward a mental prosthesis utilizing event-related brain potentials", Electroencephalography and clinical Neurophysiology, 1988, 70: 510-523, Elsevier Scientific Publishers Ireland. Ltd.

Pineda, J.A. et al., "Learining to Control Brain Rhythms: Making a Brain-Computer Interface Possible," IEEE Transactions on Neural Systems and Rehabilitation Engineerings, vol. 11, No. 2, pp. 181-184 (Jun. 2003).

J.R. Wolpaw et al., "Brain-Computer Interfaces for Communication and Control", Clinical Neurophysiology 113 (2002) 767-791.

Krepki, R. et al., "The Berlin Brain-Computer Interface (BBCI) towards a new communication channel for ontline control of multimedia applications and computer games" 9th International Conference on Distributed Multimedia Systems (DMS'03), pp. 237-244, 2003.

K.R. Shenoy et al., "Neural Prosthetic Control Signals from Plan Activity" NeuroReport, Motor Systems, vol. 14, No. 4, Mar. 24, 2003.

C. Guger et al., "Real-Time EEG Analysis with Subject Spatial Patterns for a Brain-Computer Interface (BCI)", IEEE Transactions on Rehabilitation Engineering, vol. 8, No. 4, Dec. 2000.

M. Pregenzer et al., "Frequency Component Selection for an EEG-Based Brain to Computer Interface", IEEE Transactions on Rehabilitation Engineering, vol. 7, No. 4, Dec. 1999.

D.J. McFarland et al., "Brain-Computer Interface (BCI) Operation: Optimizing Information Transfer Rates" Biological Psychology 63 (2003) 237-251.

Kelly, S.P. et al., "EEG-Based Brain Computer Interface control in an Immersive 3-D Gaming Environment", http://ee.ucd/~rreilly/elevation/KellyIEI.pdf [accessed Sep. 4, 2008], 6 pages.

Bossetti, C.A. et al., "Transmission Latencies in a Telemetry-Linked Brain-Machine Interface", IEEE Transactions on Biomedical Engineering, vol. 52, No. 6, pp. 919-924 (Jun. 2004).

J.R. Wolpaw et al., "An EEG-Based Barin-Computer Interface for Cursor Control", Electroencephalography and clinical Neurophysiology, 1991, 78: 252-259.

* cited by examiner

300

|   |   |   |   |   |   |   |   |
|---|---|---|---|---|---|---|---|
| A | B | C | D | E | F | G | H |
| I | J | K | L | M | N | O | P |
| Q | R | S | T | U | V | W | X |
| Y | Z | a | b | c | d | e | f |
| g | h | i | j | k | l | m | n |
| o | p | q | r | s | t | u | v |
| w | x | y | z | @ | # | $ | % |
| & | ? | ( | ) | < | > | + | = |

*FIG. 3A*

|   |   |   |   |   |   |   |   |
|---|---|---|---|---|---|---|---|
| A | B | C | D | E | F | G | H |
| I | J | K | L | M | N | O | P |
| Q | R | S | T | U | V | W | X |
| Y | Z | a | b | c | d | e | f |
| g | h | i | j | k | l | m | n |
| o | p | q | r | s | t | u | v |
| w | x | y | z | @ | # | $ | % |
| & | ? | ( | ) | < | > | + | = |

*FIG. 3B*

|   |   |   |   |   |   |   |   |
|---|---|---|---|---|---|---|---|
| A | B | C | D | E | F | G | H |
| I | J | K | L | M | N | O | P |
| Q | R | S | T | U | V | W | X |
| Y | Z | a | b | c | d | e | f |
| g | h | i | j | k | l | m | n |
| o | p | q | r | s | t | u | v |
| w | x | y | z | @ | # | $ | % |
| & | ? | ( | ) | < | > | + | = |

*FIG. 3C*

| A | B | C | D | E | F | G | H |
|---|---|---|---|---|---|---|---|
| I | J | K | L | M | N | O | P |
| Q | R | S | T | U | V | W | X |
| Y | Z | a | b | c | d | e | f |
| g | h | i | j | k | l | m | n |
| o | p | q | r | s | t | u | v |
| w | x | y | z | @ | # | $ | % |
| & | ? | ( | ) | < | > | + | = |

FIG. 5A

| A | B | C | D | E | F | G | H |
|---|---|---|---|---|---|---|---|
| I | J | K | L | M | N | O | P |
| Q | R | S | T | U | V | W | X |
| Y | Z | a | b | c | d | e | f |
| g | h | i | j | k | l | m | n |
| o | p | q | r | s | t | u | v |
| w | x | y | z | @ | # | $ | % |
| & | ? | ( | ) | < | > | + | = |

| A | B | C | D | E | F | G | H |
|---|---|---|---|---|---|---|---|
| I | J | K | L | M | N | O | P |
| Q | R | S | T | U | V | W | X |
| Y | Z | a | b | c | d | e | f |
| g | h | i | j | k | l | m | n |
| o | p | q | r | s | t | u | v |
| w | x | y | z | @ | # | $ | % |
| & | ? | ( | ) | < | > | + | = |

FIG. 6A

| A | B | C | D | E | F | G | H |
|---|---|---|---|---|---|---|---|
| I | J | K | L | M | N | O | P |
| Q | R | S | T | U | V | W | X |
| Y | Z | a | b | c | d | e | f |
| g | h | i | j | k | l | m | n |
| o | p | q | r | s | t | u | v |
| w | x | y | z | @ | # | $ | % |
| & | ? | ( | ) | < | > | + | = |

FIG. 6B

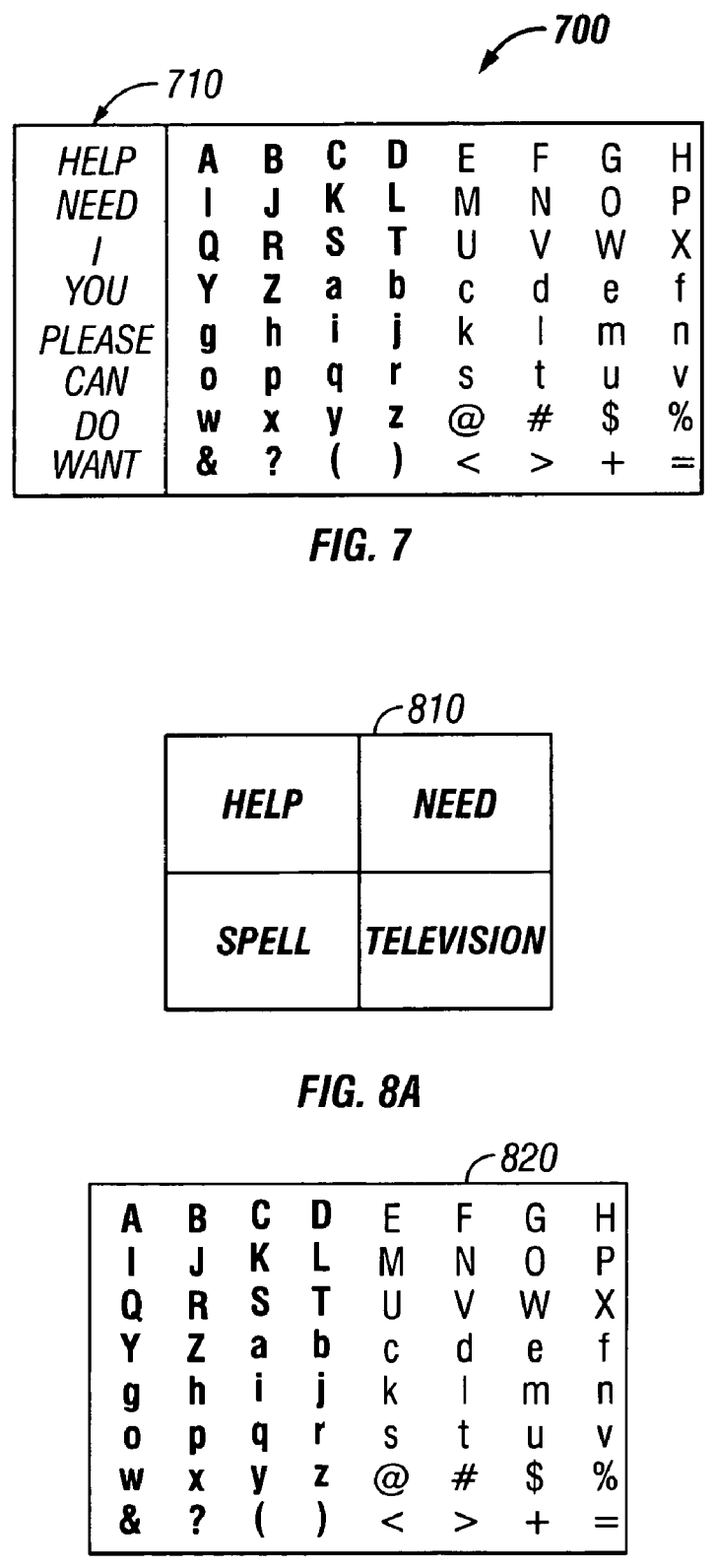

| | | | | | | | | |
|---|---|---|---|---|---|---|---|---|
| HELP | A | B | C | D | E | F | G | H |
| NEED | I | J | K | L | M | N | O | P |
| I | Q | R | S | T | U | V | W | X |
| YOU | Y | Z | a | b | c | d | e | f |
| PLEASE | g | h | i | j | k | l | m | n |
| CAN | o | p | q | r | s | t | u | v |
| DO | w | x | y | z | @ | # | $ | % |
| WANT | & | ? | ( | ) | < | > | + | = |

*FIG. 7*

| HELP | NEED |
|---|---|
| SPELL | TELEVISION |

*FIG. 8A*

| A | B | C | D | E | F | G | H |
|---|---|---|---|---|---|---|---|
| I | J | K | L | M | N | O | P |
| Q | R | S | T | U | V | W | X |
| Y | Z | a | b | c | d | e | f |
| g | h | i | j | k | l | m | n |
| o | p | q | r | s | t | u | v |
| w | x | y | z | @ | # | $ | % |
| & | ? | ( | ) | < | > | + | = |

*FIG. 8B*

Communication Service

Television On

Non-emergency Nurse Request

Emergency

COMMUNICATION METHODS BASED ON BRAIN COMPUTER INTERFACES

CROSS-REFERENCE TO RELATED APPLICATIONS

This application claims the benefit of U.S. Provisional Patent Application No. 60/476,507 entitled "COMMUNICATION METHODS BASED ON BRAIN COMPUTER INTERFACES" and filed on Jun. 5, 2003, the entire disclosure of which is incorporated herein by reference as part of this application.

STATEMENT REGARDING FEDERALLY SPONSORED RESEARCH

This invention was funded in part by Grant No. 5 R01 MH54231-03, awarded by the National Institute on Drug Abuse. The government may have certain rights in the invention.

TECHNICAL FIELD

This invention relates to interfaces between a brain and a data processor, such as brain computer interfaces (BCIs).

BACKGROUND

Computer interfaces, such as brain computer interfaces and others, may be used to assist people to operate computers and other data processor-based devices and software applications without operation conventional input/output interfaces such as keyboards and pointing devices.

For some disabled persons, communication with others can be extremely difficult. For example, persons suffering from multiple sclerosis, cerebral palsy, spinal cord injuries, and the like may have a limited or non-existent ability to communicate using common communication methods such as speech, handwriting, and gesture. For these persons, a BCI may enable easier and more accurate communication.

Additionally, a BCI may provide for more natural and intuitive interaction with a computer than some common modes of communicating with a computer, such as keyboard input and mouse input.

In a BCI, brain activity is detected and processed. The processed parameters are then used as input to the computer. Note that, as used herein, the term "computer" refers generally to data processors, and can include devices such as personal data assistants (PDAs), telephones, and other electronic devices with data processing capabilities.

SUMMARY

In general, in one aspect, a method comprises generating a plurality of stimuli. The method may further include generating a signal indicative of brain activity while generating the plurality of stimuli. The signal indicative of brain activity may include a first portion indicative of brain activity responsive to stimulus, and may further include a second portion substantially independent of response to stimulus.

The method may further include processing the signal indicative of brain activity to generate a processed signal. Processing the signal indicative of brain activity may comprise increasing the relative magnitude of the first portion with respect to the second portion. The method may further comprise determining a user selection based on the processed signal.

Systems and techniques as described herein may provide for one or more of the following advantages. Information throughput may be improved by enabling a user to generate more cognemes per minute, decreasing the number of cognemes needed to convey a message, and by categorizing cognemes quickly and accurately, where the term "cognemes" refers to the the smallest quantifiable mental activity capable of producing a difference in meaning in a BCI. Improved information throughput may be obtained while maintaining an acceptable user comfort level.

The details of one or more exemplary implementations are set forth in the accompanying drawings and the description below. Other features and advantages will be apparent from the description and drawings, and from the claims.

DESCRIPTION OF DRAWINGS

FIGS. 3A to 3C are displays, according to some implementations.

FIGS. 5A to 5D show displays with different symbol highlighting, according to some implementations.

FIGS. 6A and 6B show displays where symbols are highlighted in unpredictable patterns, according to some implementations.

FIG. 7 shows a display including probable ideas to be communicated, according to some implementations.

FIGS. 8A and 8B show an implementation of a system incorporating a dynamic display.

Like reference symbols in the various drawings indicate like elements.

DETAILED DESCRIPTION

Figures 1, 2:
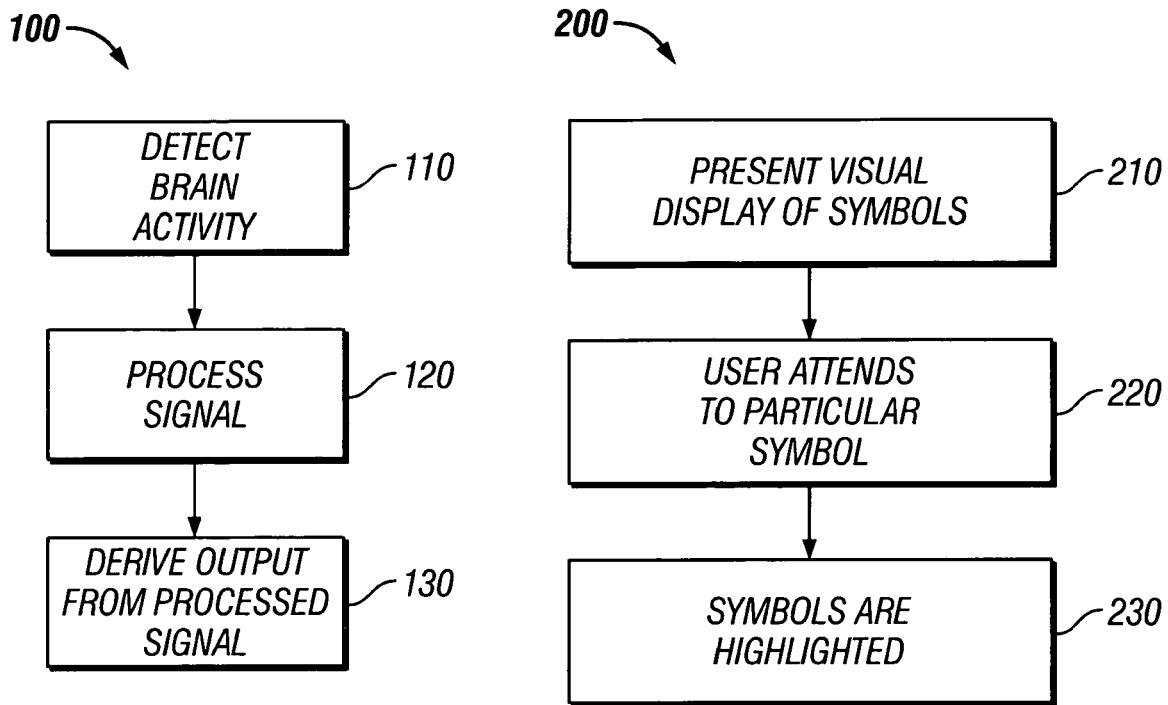
FIG. 1 is a process for producing an input based on detected brain activity, according to some implementations.
FIG. 2 is a process for communicating ideas using symbols, according to some implementations.

As sensor, signal processing, and data processing technology become more sophisticated, faster and more accurate brain computer interfaces may be developed.

As noted above, BCIs may be used by disabled persons with limited or no communication ability to communicate with the outside world via a data processing system such as a computer. Fast and accurate BCIs may thus provide a significant improvement in the quality of life for some disabled persons.

Even for persons without disabilities, BCIs may enable more intuitive, hands-free input than common input devices such as keyboards and mice. Other uses for BCIs include circumstances in which other communication methods may be difficult. For example, a BCI may be useful in a combat situation, where it may be difficult to communicate verbally or by hand. However, the low information throughput of available BCIs currently make their use impractical for many situations.

BCIs may be said to belong to one of two general classes: asynchronous (non-cue based) BCIs and synchronous (cue based) BCIs. Synchronous BCIs allow the user to send messages or commands by producing one of several different mental responses to discrete events, while asynchronus BCIs allow a user to send information independent of external events.

A BCI in which visual stimulus is provided and a resulting P300 Event Related Potential (ERP) is detected is an example of a synchronous BCI. In response to a visual stimulus such as a flash, a large positive-going potential (the P300 ERP) is generated beginning around 250 milliseconds from the onset of the stimulus. The resulting ERP is different if the user is attending to the stimulus or ignoring the stimulus.

In both synchronous and asynchronous BCIs, a user communicates by repeatedly engaging in specific mental activities that create distinct signatures. These mental activities form the building blocks of a BCI language. Analogous to the words "grapheme" and "phoneme" which describe the smallest meaningful elements of a language, the term "cogneme" refers to the smallest quantifiable mental activity capable of producing a difference in meaning in a BCI. For example, in a synchronous P3 BCI, a cogneme is the user's response to one of two events: "/attending to the stimulus/" and "/ignoring the stimulus/."

In order to determine whether a user is attending to a particular stimulus or ignoring the stimulus, the user's brain activity is detected and processed. For example, sensors of an electroencephalogram (EEG) system generate signals that are indicative of the sensed brain activity. Brain activity may be said to include a number of different "signals," such as the P300, N100, SSVER (steady state visual evoked response), ERN (error related negativity), P200, and N200. In order to determine whether the user is attending to a particular stimulus, these signals may be detected (e.g., isolated from the signal indicative of brain activity). The BCI may then determine if the user is attending to the stimulus or ignoring the stimulus based on the detected signals (e.g., using pattern recognition).

FIG. 1 shows a process 100 that may be used in some implementations of a BCI. Brain activity in response to stimulus is detected at 110. For example, one or more sensors can be used to detect brain activity using an electromagnetic detection system such as an electroencephalogram (EEG) system.

In some implementations, P300 activity (which reflects the brain's response to stimulus) may be detected to determine whether a user is attending to or ignoring a stimulus, and to derive a desired output. In other implementations, different or additional indicators of brain activity (e.g., the N100, SSVER, or other signal) may be detected. Some other indicators are described in more detail below.

Similarly, different systems may be used to detect brain activity. Although EEG systems are well known, other systems may be used. Some other examples include functional magnetic resonance imaging (FMRI) systems and functional near infrared (FNIR) systems.

A signal indicative of the detected brain activity may be processed at 120. For example, an event related potential (ERP) for P300 activity may be extracted from the EEG signal, and its signal characteristics may be determined. The analog signal may be converted into a digital signal. The digital signal may be processed further. For example, the digital signal may be processed using a pattern recognition algorithm.

One or more outputs may be derived from the processed signal at 130. For example, the system may determine that the user wishes to communicate a particular letter or other symbol. A signal indicative of the letter or other symbol may be output and used as an input to a display or other communication apparatus.

For example, an attended-to letter may be part of a word being spelled, which may then be displayed, "spoken" using a voice synthesizer, or otherwise communicated. In another example, an attended-to symbol may indicate that the user needs medical attention, and the communication apparatus may be a call system for calling a nurse or doctor.

FIG. 2 shows an implementation of a process 200 for communicating ideas using symbols such as alphanumeric symbols. At 210, a user is presented with a visual display of possible symbols that may be used to convey ideas. For the purposes of illustration, standard ASCII characters are discussed herein; however, the described systems and techniques may be used with other symbols.

FIG. 3A shows an example of a visual display 300 that may be used. FIG. 3A is an 8×8 grid containing the 26 letters of the alphabet, numbers, and special characters. Display 300 may be, for example, a computer screen.

At 220, a user attends to a particular element of the display. For example, if the user were interested in communicating the word "mother," the user would first attend to the letter "m" on display 300.

At 230, a visual stimulus is produced by highlighting symbols in the display. The symbols may be highlighted in a number of ways. For example, the intensity of display for highlighted symbols may be increased with respect to symbols that are not highlighted. In another example, highlighted symbols may be one color (e.g., green), while symbols that are not highlighted area different color (e.g., yellow).

FIGS. 3B and 3C show a system in which columns and rows of the matrix are highlighted in an unpredictable sequence (e.g., randomly). In an exemplary sequence, each of the rows are highlighted, then each of the columns are highlighted. FIG. 3B shows the column containing the letter "m" highlighted, while FIG. 3C shows the row containing the letter "m" highlighted.

During the time when the user is attending the particular symbol of interest, the signal indicative of brain activity is processed to determine whether the user is attending to a highlighted symbol (at 240). For example, the P300 ERP may detected. When a row or column including the symbol of interest is highlighted, the ERP is larger than when it is not.

At 250, the position of the attended-to symbol is determined. For example, the time-dependent ERP signal is processed to determine the row and column of the symbol of interest. Note that in some implementations, the row and/or column including the symbol of interest may need to be highlighted a number or times (e.g., four to five times) before the symbol of interest can be determined with sufficient confidence.

At 260, the identified symbol of interest may be displayed or otherwise communicated. At 270, the user may attend to the next symbol of interest (e.g., the letter "o" in the word "mother").

FIGS. 3A to 3C show an 8×8 matrix. However, more or fewer symbols may be used. The current inventors determined that a larger response may be obtained using a larger matrix. For example, a larger posterior P300 amplitude was obtained using a 12×12 matrix compared to an 8×8 matrix. Thus, in some implementations, the system may display larger numbers of symbols than are currently used (e.g., more than 80 symbols, or between 80 and 200 symbols).

Figure 4:
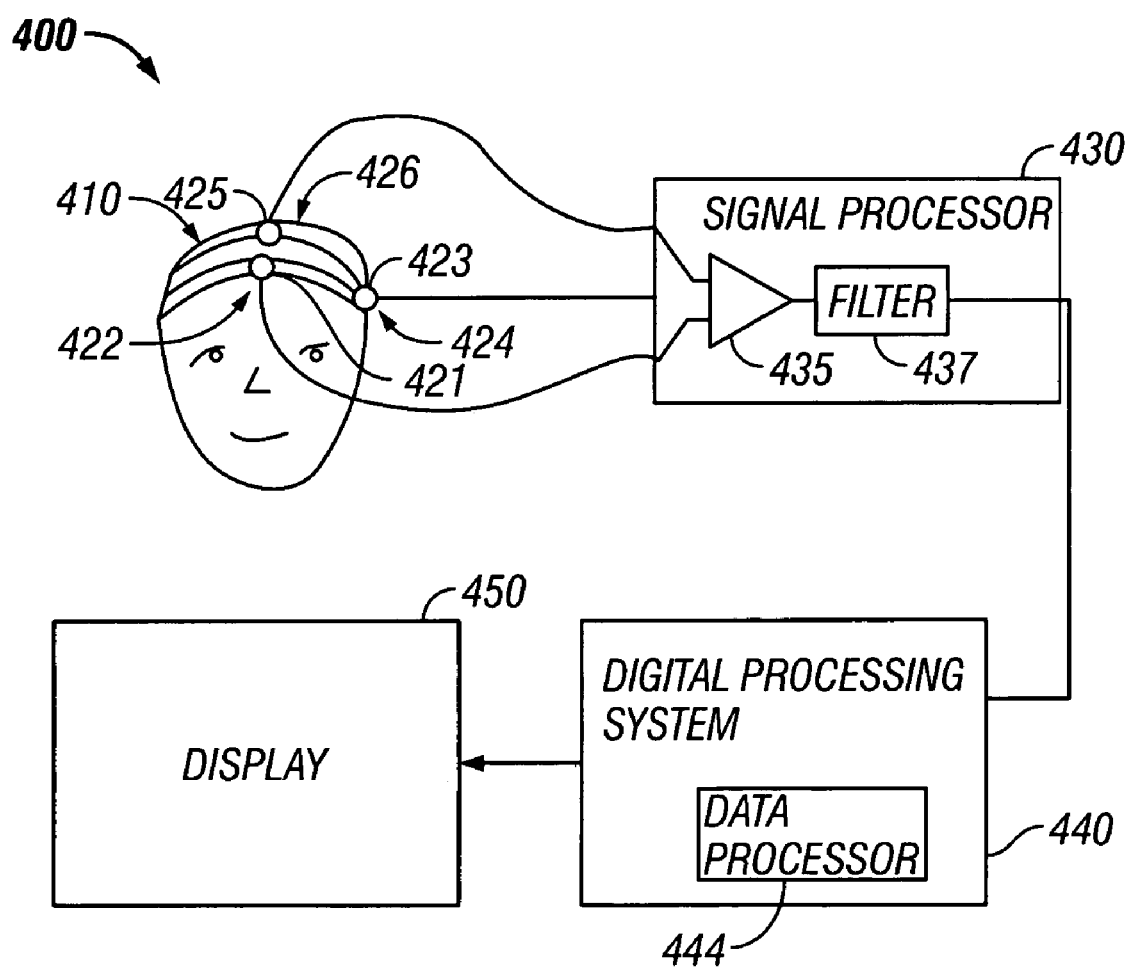
FIG. 4 is a system that may be used to implement a process such as that shown in FIG. 1.

FIG. 4 shows a system 400 that may be used to implement process 100. A sensor apparatus 410 is positioned proximate to a user's brain. For example, sensor apparatus 410 may be a headset having one or more sensors (such as wet sensors and/or dry sensors).

For example, sensor apparatus 410 may include a ground sensor 421 to be placed at a first position 422 (e.g., the user's forehead), a reference sensor 423 to be placed at a second position 424 (e.g., the user's mastoid), and an active sensor 425 to be placed at a third position 426 on the user's scalp 420 (e.g., a posterior or anterior site on the user's scalp). As noted above, additional or different sensors and/or positions may be used.

One or more signals from sensor apparatus 410 may be provided to a signal processor 430. For example, a signal from reference sensor 423 and a signal from active sensor 425 may be input to a signal processor 430. Signal processor 430 may include one or more amplifiers, such as a differential amplifier 435. Differential amplifier 435 may output an amplified difference signal. Signal processor 430 may also include one or more filters such as filter 437.

Output from signal processor 430 may be provided to a digital processing system 440. System 440 may include one or more analog to digital converters (A/D converters), such as A/D converter 442, and may also include a data processor 444. A/D converter 442 may convert analog signals to digital signals, which may then be processed by data processor 444.

Data processor 444 may determine attended-to symbols (e.g., alphanumeric characters) by analyzing the digital signals. Data processor 444 may output one or more signals indicative of the attended-to symbols to storage (e.g., internal or external memory), or to an output device such as a display 450, a voice synthesizer, or some other output device.

Note that at least some signal processing may be accomplished proximate to the sensing site. For example, "active electrodes," may be used. Active electrodes may include at least some elements of signal processor 430, such as one or more amplifiers and/or filters. Additionally, at least some portion of system 400 may be shielded. For example, amplifier 435 may be shielded, as may any cables used to transmit signals. Other components of system 400 may be shielded as well, such as the sensors.

Note also that system 400 is exemplary, and other implementations are possible. For example, A/D conversion may be implemented in signal processor 430, and additional elements may be included in processor 430 and digital processing system 440. Some functionality shown as being accomplished in processor 430 (e.g., amplification and/or filtering) may be accomplished differently (e.g., in a different order, or after the signal has been converted to a digital signal).

Although FIG. 4 shows a single active sensor, multiple active sensors may be used. The spatial distribution of signals indicative of brain activity may be more easily determined using multiple active sensors. The spatial and temporal distribution of brain activity may be used by the processing and pattern recognition elements of a BCI system to more accurately determine if a user is attending to a stimulus or not attending to a stimulus.

For example, for lower target probabilities (e.g., highlighting a single row or column in a matrix), the amplitude of the P300 ERP increases from anterior to posterior sites. For higher target probabilities (e.g., highlighting multiple rows or columns), the posterior P300 ERP becomes smaller, while the anterior does not. Thus, the spatial distribution of the P300 ERP may be used to more accurately discriminate between attended-to events and ignored events.

The speed of current BCIs is generally much slower than other input modes. Currently, information transfer rates of up to about 10-25 bits per minute may be obtained. There are a number of ways in which the speed may be increased, such as presenting stimuli more quickly (thus enabling the user to generate more cognemes per minute), decreasing the number of cognemes needed to convey a message (e.g., by increasing the amount of information obtained from each cogneme), and by categorizing cognemes more quickly and accurately (e.g., by creating more robust differences between the signals corresponding to different values of the cogneme).

A number of methods may be used to enhance the desired signal to more accurately determine whether the user is attending to a stimulus or ignoring the stimulus. In some implementations of a process such as process 200, the user is asked to count the flashes that highlight the attended-to symbol, and to ignore (and not count) the other flashes. Counting may increase the amplitude of the P300 ERP or other desired signal.

In some implementations, the user's physiological response to stimulus may be increased. For example, the user may use a substance such as caffeine or nicotine to heighten the user's response to stimulus. In another example, biofeedback may be used to train the user to respond more strongly to stimulus.

The current inventors also determined that the placement of symbols on a display may provide for more accurate determination of whether a user is attending to a stimulus. The current inventors determined that symbols on the periphery of a display are more easily attended to than those on the interior of a display. Thus, in some implementations, the display places the most commonly used symbols on the periphery.

The determination of which symbols are most commonly used may be based on average symbol use in the population in general (e.g., the letters of the alphabet most commonly used to spell words may be placed on the periphery of a display of letters), and/or may be adapted to a particular user.

For example, a display may initially place symbols believed to be most commonly used on the periphery. As the user interacts with the system, the system may determine that other symbols are used more often by the particular user, and the system may update the display accordingly.

In some implementations, higher information throughput may be obtained by flashing multiple rows and columns rather than flashing single rows and single columns. FIG. 5A shows an eight by eight matrix with a single column highlighted, while FIGS. 5B to 5D show multiple rows highlighted. When multiple rows or columns are used, the number of events for isolating the target character may theoretically be reduced. For example, in an 8×8 matrix, 16 single row/column highlighting cycles are needed to highlight the row and column of each symbol. In contrast, only 6 highlighting cycles are needed to highlight the row and column of each symbol when four rows/columns are highlighted in a highlighting cycle.

In an implementation, for a display of N symbols, each of the N symbols may be highlighted every two to three cycles. That is, approximately half of the N symbols may be highlighted at a first time (e.g., four rows of an eight row matrix), and the remaining symbols may be highlighted at a second time (e.g., the remaining four rows of the eight row matrix. All N symbols are highlighted every two cycles. The highlighting is repeated for the columns of the matrix.

In some implementations, different numbers of symbols may be highlighted in different highlighting cycles. For example, for an 8×8 matrix, a sequence of two rows, four rows, and two rows may be used to highlight all rows of the matrix, while a sequence of one column, four columns, and three columns may be used to highlight all columns in the matrix.

In another example, symbols may be highlighted in different patterns than by row or column. FIGS. 6A and 6B show examples where eight characters are highlighted in a random pattern. These other patterns may be termed "splotches." Splotches may elicit more pronounced responses to stimuli (e.g., P300 ERPs of larger magnitude) for a number of reasons. First, splotches are more novel than rows or columns. Second, the use of splotches reduces the number of flashed elements flanking any attended target. Third, splotches may be easier for users to detect at higher presentation speeds.

The information throughput may also be increased by determining the most probable attended-to symbol based on the past attended-to symbols. For example, a user may want to spell the word "mother." The system first determines that the user has attended to the letter "m." The system may use a language processing algorithm to determine that the next letter is almost certainly going to be a vowel, and may also determine the relative probabilities of the different vowels. The system may thus preferentially highlight symbols to more quickly determine the attended-to symbol.

FIG. 7 shows another example of a display 700 that may be used to increase the speed of a BCI. Display 700 includes not only alphanumeric characters, but also displays the most likely words that the user is trying to communicate. For example, prior to attending to any particular letter, the display may include the complete set of alphanumeric characters, as well as a number of words that the system determines (either based on global use or the particular user) the most likely. Column 710 shows an exemplary display of likely words. If the user wants to communicate one of those words, the user attends to that word. If not, the user attends to a particular alphanumeric symbol.

After the system determines the attended-to symbol, the most probable words beginning with that symbol are displayed in column 710. As before, if the desired word is displayed, the user attends to the desired word. If not, the user attends to the next letter in the word. The process continues until the user has communicated a word. If the user wants to communicate additional words, the system may present the most probable choices in column 710, based on the communication of the prior word. Note that the process may be used for sentence suggestion and/or completion as well.

The speed and flexibility of the system may also be increased by using a dynamic display. In an implementation, an initial display may provide a first set of N symbols, such as a menu. The menu may include some probable desired actions, which may depend on the particular user and/or circumstances. A user may attend to the most appropriate choice on the first menu. As a result, a second different display may be presented to the user. The second different display may include M symbols, where M is different than N. The system may include a number of different displays that may be presented to the user based on the user's choice in a different display.

FIGS. 8A and 8B show an implementation of a system incorporating a dynamic display. A first display 810 is provided to a user. First display 810 includes a menu of four possible desired items. If the user would like to communicate an idea by spelling words, the user attends to the "Spell" symbol on display 810.

In response to determining that the user is attending to the "Spell" symbol, the system presents a second display 820. Display 820 is an 8×8 matrix including the letters of the alphabet, as well as additional characters.

In another implementation of a dynamic display, each user response may be used to identify or eliminate a portion of the symbols (e.g., half of the symbols), which may be replaced by different symbols.

The speed may also be increased by presenting stimuli more quickly. The time between consecutive stimuli (e.g., the time between highlighting different symbols or sets of symbols) is referred to as the stimulus onset asynchrony (SOA). Shorter SOAs provide greater information throughput, but generally correlate with larger error rates and user fatigue. The current inventors determined that SOAs of about 125 msec to about 250 msec provide high information throughput but allow users to interact via the BCI in relative comfort.

However, longer SOAs may be beneficial for ill or disabled users. For example, SOAs of about 600 msec to about 1 second may be beneficial for some users, while a range from about 800 msec to 1.5 or 2 seconds may be beneficial for others. Generally, more severely disabled persons may benefit from longer SOAs.

In order to increase the novelty of the display (and thus the response to the stimulus), a non-constant interval between stimuli may be used. For example, rather than highlighting elements in a display every 125 msec, the elements may be highlighted at intervals ranging unpredictably from 125 to 150 msec.

As noted above, some implementations use the P300 ERP to determine whether a user is attending to a stimulus. The P300 is a positivity in the ERP that peaks between 300 and 500 milliseconds post-stimulus and whose spatial distribution, amplitude, and latency have been shown to fluctuate predictably with attention, memory, decision-making, and other cognitive factors. Studies have shown that the amplitude and latency vary with differences along several stimulus dimensions such as complexity, subjective probability, frequency, novelty, spatial attention, and task relevance, as well as a variety of biological and environmental factors.

In some implementations, signals other than the P300 may be used in a BCI. For example, signals such as the N100, P300, SSVER (steady state visual evoked response), ERN (error related negativity), P200, and N200 may be used. Additionally, the inventors recognized that late activity following a P300 ERP, which may be referred to as P600 activity, may be used in a BCI. The BCI may use a single signal, or may use more than one signal.

For example, in some implementations an SSVER signal may be used. The SSVER is a continuously oscillatory brain potential associated with a visual event that repeats at a constant frequency. The SSVER signal may be evoked by events having frequencies in the range of about 4 Hz to about 40 Hz. The SSVER response differs according to both the frequency of the stimulus and the phase, and either or both may be used in a BCI.

Figure 9:
FIG. 9 shows a display that may be used with a system incorporating SSVER detection, according to some implementations.
Figure 9:
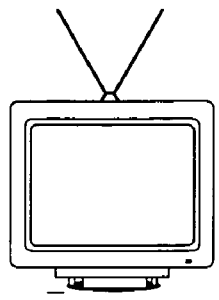
Figure 9:
Figure 9:

FIG. 9 shows a display that may be used with a BCI incorporating SSVER detection. FIG. 9 shows a display having a relatively small number of symbols: words and icons representing the concepts "Communication Service," "Television On," "Non-emergency Nurse Request," and "Emergency." To elicit an SSER response, the symbol is highlighted cyclically (for example, its intensity is varied from brighter to dimmer) at an appropriate frequency. Generally, frequencies ranging from about 4 Hz to about 40 Hz can elicit an SSVER response.

In a BCI incorporating SSVER detection, different modes of operation may be used. First, each of the symbols may be highlighted in turn. That is, the symbol representing "Emergency" may be highlighted by varying its intensity from brighter to dimmer at a particular frequency for a time, while the symbols "Television On," "Non-emergency Nurse Request," and "Communication Service," are not highlighted. The other symbols may be cyclically highlighted in turn (analogous to the modes described above in which rows or columns are highlighted).

Another mode may be used with the SSVER signal. Each of the symbols may simultaneously be highlighted at a different frequency, and the SSVER signal processed to determine which symbol the user was attending to.

For example, the intensity of the "Communication Service" symbol may be varied from brighter to dimmer at a frequency $f_1$. The intensity of the "Television On," "Non-emergency Nurse Request," and "Emergency" symbols may be varied at frequencies $f_2$, $f_3$, and $f_4$, respectively. The SSVER signal indicates which symbol the user was attending to. The system may process the elicited SSVER signal to determine which symbol the user is attending to.

To improve the signal to noise ratio, the frequency difference between the different frequencies $f_1$ to $f_4$ should be relatively large, while still being in the frequency range that will elicit an SSVER response. For example, $f_1$ may be 6 Hz, $f_2$ may be 14 Hz, $f_3$ may be 22 Hz, and $f_4$ may be 30 Hz. Of course, other values may be used. Further, although four symbols are shown in FIG. 9, more or fewer symbols may be used, as long as the system can discriminate between attention to different symbols. Note also that the phase may be used instead of or in addition to the frequency. Using both phase and frequency may allow more symbols to be used (e.g., eight symbols may be used, with four different frequencies and two different phase states).

In another example, an N100 signal may be used. The N100 signal may be affected by the direction of the user's attention. Events in the focus of attention tend to elicit larger N100 components. The N100 signal may therefore be used to monitor changes in the direction of attention or changes in the user's attentional level. A BCI may use a N100 signal to determine whether the user is attending to the stimulus, or whether the user's attention has shifted.

Figure 10:
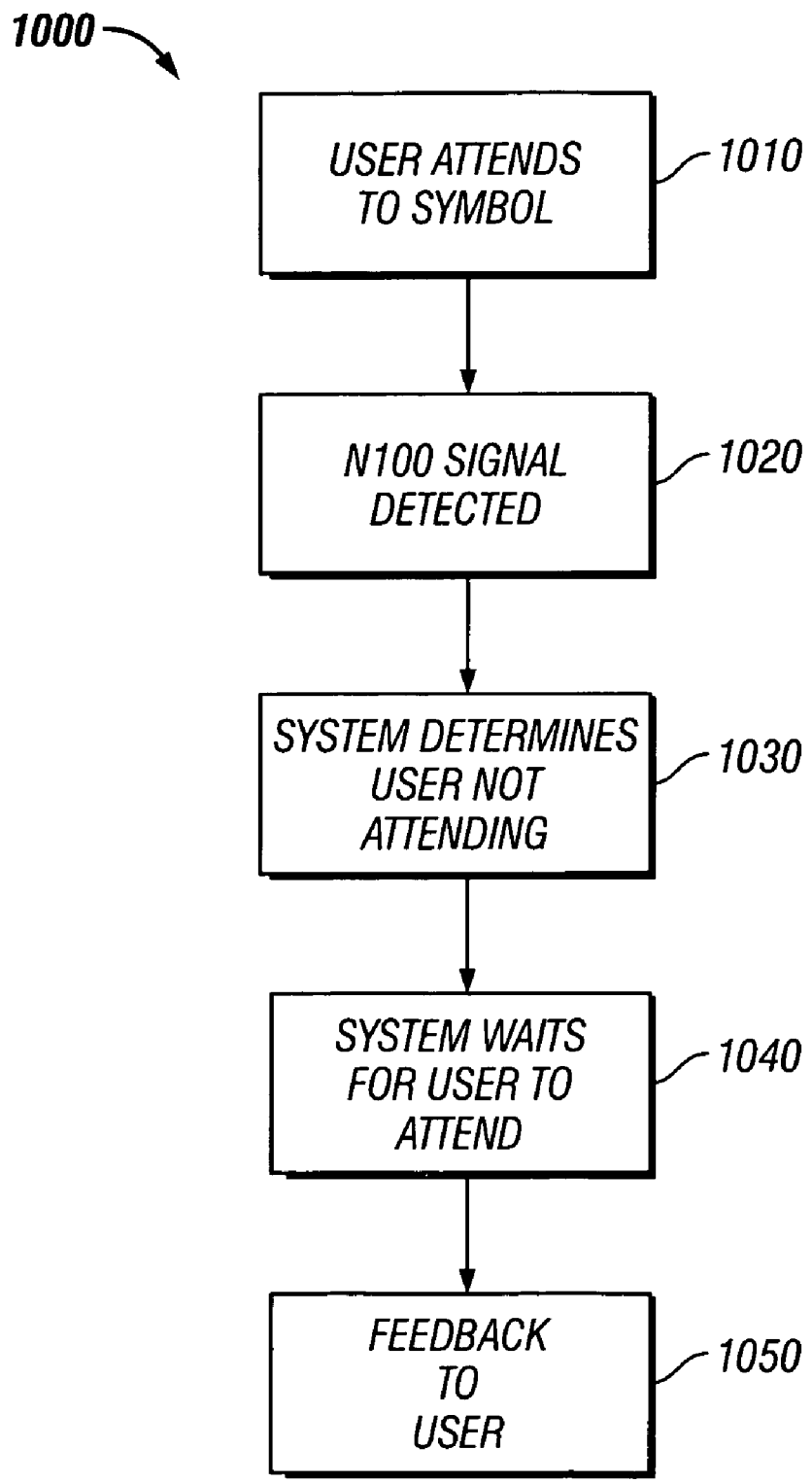
FIG. 10 shows a process using an N100 signal, according to some implementations.

FIG. 10 shows a process 1000 in which the N100 signal may be used. At 1010, the user may be interacting with the BCI by attending to a particular symbol representing a desired input (e.g., by attending to a desired option on a displayed menu). At 1020, the N100 signal may be detected while the user is interacting with the system. At 1030, the system may determine that the user is not attending to the particular symbol (e.g., because the user's attention has wandered). At 1040, the system may wait until the N100 signal indicates that the user is attending to the particular stimulus before determining the desired input. At 1050, the system may also provide feedback to the user to remind the user to attend to the particular stimulus.

Process 1000 may be useful for a BCI that is used in a distracting environment. For example, a BCI that is implemented as part of a personal data assistant (PDA) or similar system, which may be used in uncontrolled and distracting environments (e.g., while driving, in a noisy restaurant, while walking on a busy street, and the like).

Figure 11:
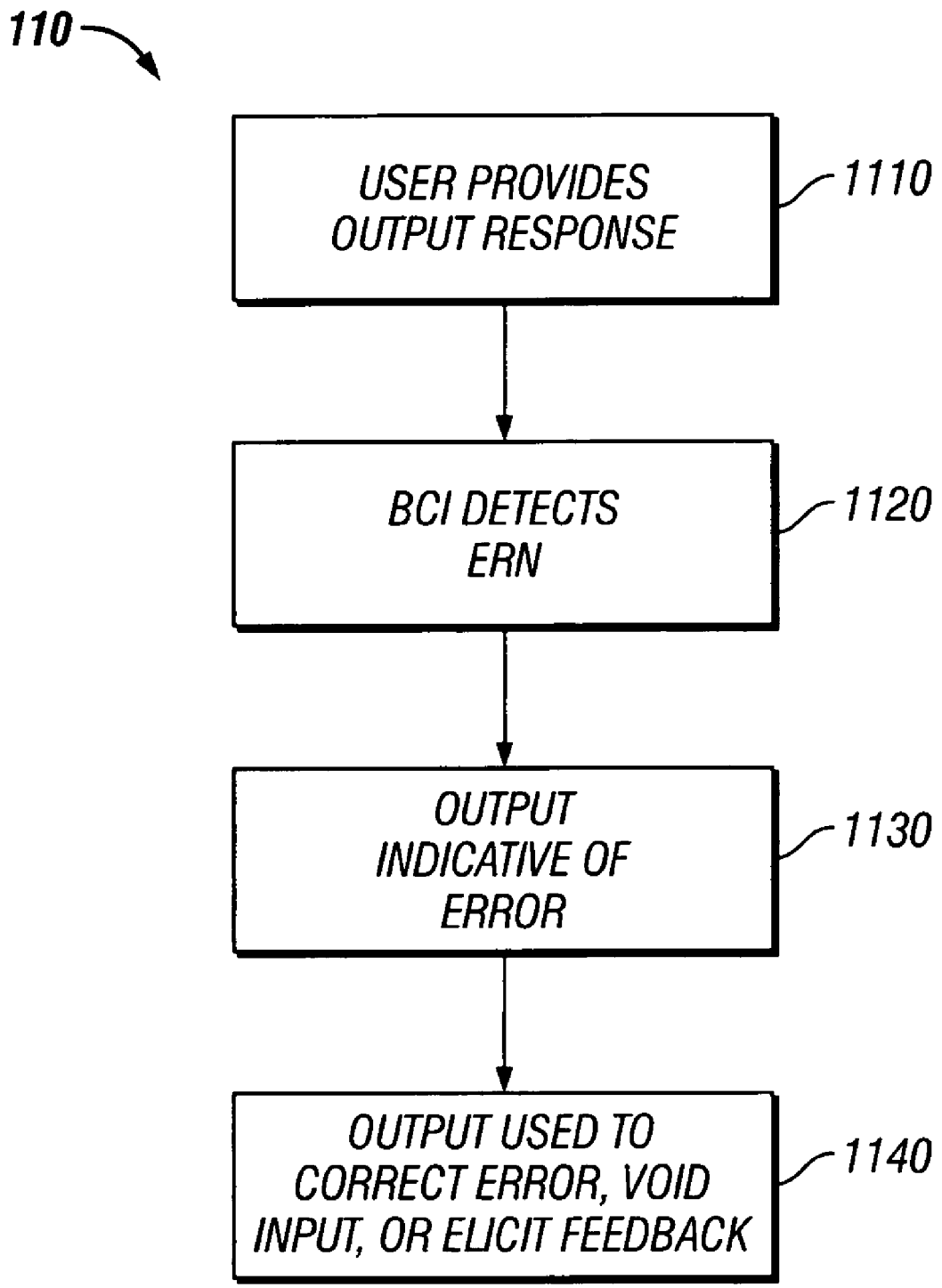
FIG. 11 shows a process using an ERN signal, according to some implementations.

In another example, an ERN signal may be used. An ERN signal is generated when a person realizes that they have made an error. FIG. 11 shows a process 1100 that may be used in a BCI incorporating ERN detection.

At 1110, a user may provide an output response. Note that the response need not be provided via a BCI, it could be provided via a keyboard, mouse, switch, or other apparatus. At 1120, a BCI system detects an ERN signal, where the ERN signal indicates that the response provided at 1110 was in error. At 1130, the BCI system produces an output indicative of a possible error. At 1140, the output indicative of an error may be used to correct the error, to void the response, or to elicit further feedback.

A BCI incorporating ERN detection may be used where an error would be unduly harmful. For example, a BCI incorporating ERN detection may be used by operators of a nuclear power plant, where an error may have harmful consequences. Rather than acting on the error immediately, a BCI may be used to void the response or require user confirmation of the response prior to acting on it, when an error signal is detected.

In another example, an ERN signal may be used for less critical applications. The ERN signal may be used to automatically correct input, or to elicit additional user feedback in a BCI or other data processing system. For example, in a data processing system using keyboard or mouse input, a user may realize that he or she has made an error. Based on a detected ERN signal, the error may be automatically corrected (e.g., using an error correction algorithm), or the system may elicit further user input (e.g., query the user to confirm the input). Of course, many other implementations are possible.

Figure 12:
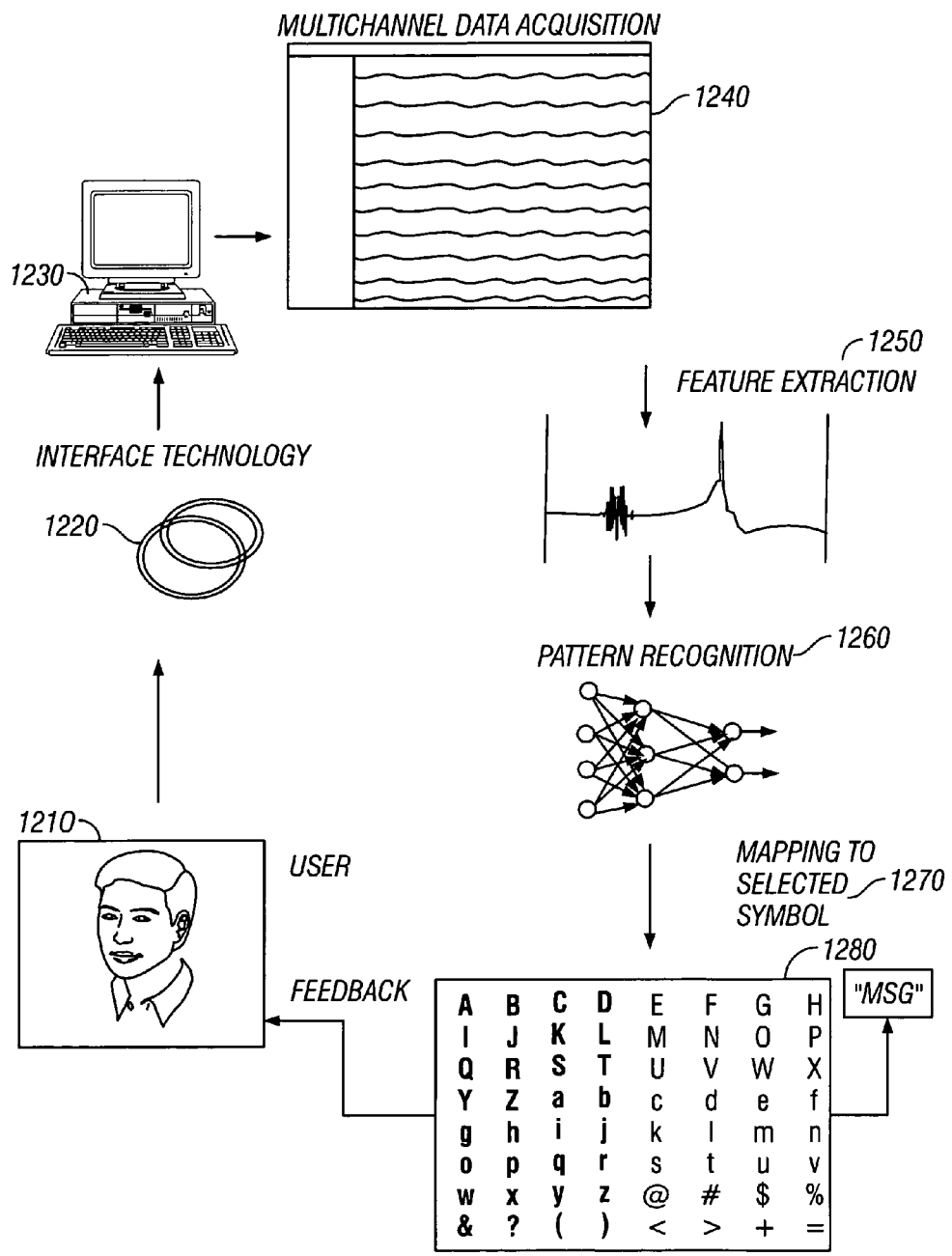
FIG. 12 shows an overall schematic of a BCI system, according to some implementations.

FIG. 12 shows an overall schematic of a BCI. A user 1210 reacts to a stimulus. The user's brain activity is sensed using interface technology 1220. The brain activity is provided to a data acquisition system 1230 for multichannel data acquisition 1240. Feature extraction 1250 is used to extract the desired signals from the brain activity. Pattern recognition 1260 is used to determine whether the desired signals indicate that the user was attending to the stimulus (e.g., highlighting of a desired symbol). The output of pattern recognition 1260 is used to map to the desired symbol 1270. A message 1280 may then be generated.

In some implementations, analog-to-digital conversion and analysis of bioelectric signals may be accomplished using dedicated software. In other implementations, off the shelf software may be used.

In some implementations, signals indicative of brain activity may be processed in order to better isolate the desired signal properties from noise.

For example, independent component analysis (ICA) techniques may be used to process signals indicative of brain activity, for robust and reliable determination of user attention.

ICA is an approach to the problem of blind source separation. ICA assumes that the perceived signal at any detection site (such as a satellite, microphone, or electrode) comprises a combination of numerous overlapping sources. The locations of these sources are assumed to be unknown, and the objective is to try to isolate the contribution of each of these independent sources based on the observed data at each site. ICA may thus be used to decompose the detected brain activity into independent spatial components that may potentially be more readily associated with cogneme activity.

The received signal $x_i$ at each site i, is assumed to be a linear combination of n sources, $s_1 \ldots s_n$. The ICA need not use specific information about the location or nature of the sources, or about the process by which the signals from each source are mixed to form the observed signal $x_i$ via a mixing matrix A. It is assumed that the sources are combined linearly to produce the perceived signal.

ICA strives to reverse this process, thereby identifying the contribution of the sources s from the perceived signal $x_i$. This is done by estimating the inverse of the mixing matrix A, $A^{-1}$ (commonly referred to as the unmixing matrix, W), thereby allowing the original signal to be reconstructed.

The unmixing matrix W may be determined using a number of different methods. These methods include the information maximization approach, as well as the maximum likelihood estimation approach. The maximum likelihood approach strives to maximize the mutual information that an output Y has about an input X. This is expressed mathematically as I(Y,X)=H(Y)−H (Y|X). I refers to the shared information, H(Y) is the entropy of the output, and the H(Y|X) represents the entropy of the output that did not stem from the input. Ideally, H(Y|X) is zero, as would be the case if no noise were present.

ICA may enable more accurate determination of user attention, by isolating the desired signal and undesired signals. For example, ICA may be used to isolate brain activity related to attention, brain activity unrelated to attention, and non-brain activity noise.

Other processing systems and techniques may be used. In some implementations, noise may be reduced using simple systems, such as filters to remove noise at particular frequencies or particular frequency ranges. For example, filtering 12 Hz contributions to the signal may remove an appreciable amount of noise due to alpha and mu activity. Filtering a frequency band between about 8 Hz and about 12 Hz may remove more noise from the signal. Filtering can involve hardware filters and/or software filters, such as digital filtering.

In another example, other signal processing algorithms may be used to reduce noise and/or enhance the signal to noise ratio of the signal indicative of brain activity. For example, a principal component analysis (PCA) technique may be used. PCA strives to find orthogonal activation patterns. PCA may be less able to remove noise that is not very different from the desired signal, but may be effective in removing second order dependencies.

In some implementations, a signal indicative of brain activity may be processed to remove particular types of undesired signals. For example, processing may be used to remove signals related to eye movements, such as signals related to blinking. These signals generally have a high amplitude, and occur at random intervals.

Processing may also be used to remove electromyogram (EMG) artifacts from a signal indicative of brain activity. EMG artifacts may be components that appear to originate from the left or right side of the scalp and then grow weaker as they traverse the head.

In some implementations, processing may be used to reduce noise due to mu activity. Mu activity shows a strong peak at around 12 Hz, and a smaller peak around 24 Hz.

In some implementations, processing may be used to reduce noise due to alpha activity. Alpha activity generally has a frequency range of 8 Hz to 12 Hz over the back part of the brain, and can be a significant source of noise, particularly when a user has his or her eyes closed. Therefore, reducing alpha noise may be particularly beneficial in BCIs tailored for users who may be unable to open their eyes or keep their eyes open.

A processing system such as an ICA system may be improved by training the system. Since brain activity is highly dependent on the particular user, training allows the processing system to adapt to the user and thus to more accurately isolate the desired signal. For an ICA system, training algorithms such as Runica, extended ICA, infomax, fastICA, or other algorithm may be used to more accurately determine the unmixing matrix for the particular user at a particular time.

The current inventors recognized that, in some cases, it may be beneficial to re-train the system. Even for a particular user, brain activity varies different at different times and/or under different circumstances. Retraining may be implemented in a number of ways. The system may adapt to changes in the user's brain activity on a continuous basis, or the system may be retrained at intervals. The system may also be retrained based on an increase in an error rate, based on the user's level of arousal or fatigue, or based on external feedback (e.g., feedback from the user or from another person).

Processing may allow for fast and accurate determination of an attended-to symbol, and thus improve the information throughput as well as the system reliability. In some previous studies, multiple trials were used to determine the attended-to symbol with desired reliability. However, an effective processing system (such as an ICA system) may allow for a reliable BCI incorporating single trial identification.

A BCI may use non-visual stimuli instead of or in addition to visual stimuli. For example, a BCI incorporating auditory stimuli and/or using touch may be used for persons with visual impairments. Auditory stimuli may include, for example, spoken words, spoken letters, and different tones representing different ideas that the user may want to communicate. Auditory stimuli may also be used in combination with visual stimuli. For example, in a BCI where groups of symbols are highlighted, different tones may be produced for different highlighted groups. The additional auditory stimulus may increase the novelty of the highlighting, and thus increase the magnitude of the brain activity in response to the visual stimulus.

BCIs need not be the only mechanism by which input is provided to a data processing or other system. A BCI may be combined with other input types, such as keyboard and mouse input.

Although BCIs have been described above as a means of communication, BCIs may also be used in other ways. For example, a BCI may be used in a virtual reality system. Rather than communicating ideas to others, the BCI may be used to navigate through the virtual reality by attending to different stimuli provided by the system.

In implementations, the above described techniques and their variations may be implemented as computer software instructions. Such instructions may be stored on one or more machine-readable storage media or devices and are executed by, e.g., one or more computer processors, or cause the machine, to perform the described functions and operations.

A number of implementations have been described. Nevertheless, it will be understood that various modifications may be made without departing from the spirit and scope of the invention. For example, although the figures show symmetric square matrix displays, other display configurations may be used. Accordingly, other embodiments are within the scope of the following claims.

What is claimed is:

1. A method comprising:
   generating a plurality of stimuli from a plurality of symbols, wherein the plurality of symbols comprises an attended-to symbol;
   generating a signal indicative of brain activity while generating the plurality of stimuli, wherein the signal indicative of brain activity includes a first portion indicative of brain activity responsive to stimulus, and wherein the signal indicative of brain activity further includes a second portion substantially independent of response to stimulus;
   processing the signal indicative of brain activity to generate a processed signal, wherein processing the signal indicative of brain activity comprises increasing the relative magnitude of the first portion with respect to the second portion;
   determining the attended-to symbol based on the processed signal;
   generating a display of N symbols; and attending to the attended-to symbol of the N symbols,
wherein generating the plurality of stimuli comprises highlighting a first plurality T of the N symbols at a first time, and highlighting a second plurality N-T of the N symbols at a second time.

2. The method of claim 1, wherein the second portion substantially independent of response to stimulus is indicative of at least one of alpha activity, mu activity, electromyogram artifacts, and brain activity corresponding to eye movement.

3. The method of claim 2, wherein the second portion includes a contribution indicative of the at least one of alpha activity, mu activity, electromyogram artifacts, and brain activity corresponding to eye movement, and wherein increasing the relative magnitude of the first portion with respect to the second portion comprises filtering at least some of the contribution indicative of the at least one of alpha activity, mu activity, electromyogram artifacts, and brain activity corresponding to eye movement.

4. A method comprising:
generating a plurality of stimuli from a plurality of symbols, wherein the plurality of symbols comprises an attended-to symbol;
generating a signal indicative of brain activity while generating the plurality of stimuli, wherein the signal indicative of brain activity includes a first portion indicative of brain activity responsive to stimulus, and wherein the signal indicative of brain activity further includes a second portion substantially independent of response to stimulus;
processing the signal indicative of brain activity to generate a processed signal, wherein processing the signal indicative of brain activity comprises increasing the relative magnitude of the first portion with respect to the second portion;
determining the attended-to symbol based on the processed signal;
generating a display of N symbols; and
attending to the attended-to symbol of the N symbols,
wherein generating a display of N symbols comprises generating a display of N symbols having P symbols on a periphery of the display, and wherein the method further comprises determining which of the N symbols have a higher probability of being attended-to, and selectively positioning symbols with a higher probability of being attended-to on the periphery of the display.

5. The method of claim 4, wherein processing the signal indicative of brain activity comprises processing the signal using independent component analysis (ICA).

6. The method of claim 5, further comprising determining an unmixing matrix at a first time using a training algorithm.

7. The method of claim 5, wherein processing the signal using independent component analysis comprises identifying characteristics of the signal indicative of brain activity corresponding to the first portion.

8. The method of claim 7, wherein identifying characteristics of the signal indicative of brain activity corresponding to the first portion comprises identifying a P300 signal.

9. The method of claim 7, wherein identifying characteristics of the signal indicative of brain activity corresponding to the first portion comprises identifying at least one of an N100 signal, an SSVER signal, an ERN signal, a P200 signal, a P600 signal, and an N200 signal.

10. The method of claim 7, wherein identifying characteristics of the signal indicative of brain activity corresponding to the first portion comprises identifying the characteristics based on a spatial distribution of the signal indicative of brain activity.

11. The method of claim 4, wherein processing the signal indicative of brain activity comprises processing the signal using principal component analysis (PCA).

12. The method of claim 4, further comprising:
generating a display of N symbols; and
highlighting a plurality S of the N symbols at a first time, and wherein highlighting the plurality S of the N symbols does not comprise highlighting a row or a column of a matrix.

13. The method of claim 4, further comprising:
generating a display of N symbols;
determining the attended-to symbol based on the processed signal; and
generating a display of M symbols based on the determining the attended-to symbol, where at least some of the M symbols are not included in the N symbols.

14. A method comprising:
generating a plurality of stimuli from a plurality of symbols, wherein the plurality of symbols comprises an attended-to symbol;
generating a signal indicative of brain activity while generating the plurality of stimuli, wherein the signal indicative of brain activity includes a first portion indicative of brain activity responsive to stimulus, and wherein the signal indicative of brain activity further includes a second portion substantially independent of response to stimulus, wherein the first portion indicative of brain activity responsive to stimulus is indicative of at least an N100 signal;
processing the signal indicative of brain activity to generate a processed signal, wherein processing the signal indicative of brain activity comprises increasing the relative magnitude of the first portion with respect to the second portion;
determining that a user is not attending to any symbol of the N symbols based on the N100 signal;
subsequently determining that the user is attending to the attended-to symbol based on the N100 signal; and
determining the attended-to symbol based on the processed signal after the subsequently determining that the user is attending to the attended-to symbol based on the N100 signal.

15. The method of claim 14, further comprising providing feedback to the user to prompt the user to attend to the attended-to symbol.

16. A method comprising:
generating a plurality of stimuli from a plurality of symbols, wherein the plurality of symbols comprises an attended-to symbol;
generating a signal indicative of brain activity while generating the plurality of stimuli, wherein the signal indicative of brain activity includes a first portion indicative of brain activity responsive to stimulus, and wherein the signal indicative of brain activity further includes a second portion substantially independent of response to stimulus, wherein the first portion indicative of brain activity responsive to stimulus is indicative of at least a steady state visual evoked response (SSVER) signal;
processing the signal indicative of brain activity to generate a processed signal, wherein processing the signal indicative of brain activity comprises increasing the relative magnitude of the first portion with respect to the second portion;

determining the attended-to symbol based on the processed signal;

generating a display of N symbols;

highlighting a first symbol of the N symbols with a first frequency selected to elicit SSVER response;

highlighting a second symbol of the N symbols with a second frequency selected to elicit SSVER response, the second frequency different from the first frequency; and wherein the processed signal includes at least some information indicative of SSVER response, and wherein determining the attended-to symbol based on the processed signal comprises determining the attended-to symbol based on the at least some information indicative of SSVER response.

17. The method of claim 16, wherein the at least some information indicative of SSVER response includes information indicative of at least one of a frequency and a phase of SSVER response.

18. A method comprising:

generating a plurality of stimuli from a plurality of symbols, wherein the plurality of symbols comprises an attended-to symbol;

generating a signal indicative of brain activity while generating the plurality of stimuli, wherein the signal indicative of brain activity includes a first portion indicative of brain activity responsive to stimulus, and wherein the signal indicative of brain activity further includes a second portion substantially independent of response to stimulus;

processing the signal indicative of brain activity to generate a processed signal, wherein processing the signal indicative of brain activity comprises increasing the relative magnitude of the first portion with respect to the second portion, wherein the first portion indicative of brain activity responsive to stimulus is indicative of at least an error related negativity (ERN) signal, and wherein the processed signal includes at least some information indicative of the ERN signal;

determining the attended-to symbol based on the processed signal;

determining a possible error based on the at least some information indicative of the ERN signal; and generating an output indicative of a possible error.

19. The method of claim 18, wherein the possible error corresponds to an input received prior to determining the possible error, and wherein the method further comprises at least one of voiding the input and acting on the input after receiving confirmation of the input.

20. A method comprising:

generating a plurality of stimuli from a plurality of symbols, wherein the plurality of symbols comprises an attended-to symbol;

generating a signal indicative of brain activity while generating the plurality of stimuli, wherein the signal indicative of brain activity includes a first portion indicative of brain activity responsive to stimulus, and wherein the signal indicative of brain activity further includes a second portion substantially independent of response to stimulus;

processing the signal indicative of brain activity to generate a processed signal, wherein processing the signal indicative of brain activity comprises increasing the relative magnitude of the first portion with respect to the second portion, wherein processing the signal indicative of brain activity comprises processing the signal using independent component analysis (ICA);

determining an unmixing matrix at a first time using a training algorithm;

determining the unmixing matrix at a second time; and determining the attended-to symbol based on the processed signal.

21. The method of claim 20, wherein determining the unmixing matrix at the second time comprises determining the unmixing matrix at a pre-determined interval after the first time.

22. The method of claim 20, wherein determining the unmixing matrix at the second time comprises determining the unmixing matrix immediately after the first time.

23. The method of claim 20, wherein determining the unmixing matrix at the second time comprises determining the unmixing matrix at a second time based on user input.

24. The method of claim 20, wherein determining the unmixing matrix at the second time comprises determining the unmixing matrix based on an error rate.

25. The method of claim 20, wherein generating a plurality of stimuli comprises generating an audio stimulus.

26. The method of claim 20, wherein generating a plurality of stimuli comprises generating a tactile stimulus.

27. The method of claim 20, wherein generating a plurality of stimuli comprises generating at least two stimuli selected from the group consisting of a visual stimulus, an auditory stimulus, and a tactile stimulus.

28. The method of claim 20, wherein the attended-to symbol may be discriminated from a plurality of non attended-to symbols after a number of highlighting cycles, and determining the attended-to symbol based on the processed signal comprises determining the attended-to symbol based on the number of highlighting cycles.

29. The method of claim 28, wherein the attended-to symbol is included in a first row and a first column of a matrix display of N symbols, and wherein the highlighting cycles comprising highlighting the first row and the first column of the matrix.

30. A method comprising:

generating a plurality of stimuli from a plurality of symbols, wherein the plurality of symbols comprises an attended-to symbol;

generating a display of N symbols;

highlighting a plurality S of the N symbols at a first time, and wherein highlighting the plurality S of the N symbols does not comprise highlighting a row or a column of a matrix, wherein highlighting the plurality S of the N symbols comprises highlighting the plurality S of the N symbols in a random pattern;

generating a signal indicative of brain activity while generating the plurality of stimuli, wherein the signal indicative of brain activity includes a first portion indicative of brain activity responsive to stimulus, and wherein the signal indicative of brain activity further includes a second portion substantially independent of response to stimulus;

processing the signal indicative of brain activity to generate a processed signal, wherein processing the signal indicative of brain activity comprises increasing the relative magnitude of the first portion with respect to the second portion; and determining the attended-to symbol based on the processed signal.

31. The method of claim 30, wherein the first portion indicative of brain activity responsive to stimulus is indicative of at least one of a P300 signal, an N100 signal, a steady state visual evoked response (SSVER) signal, an error related negativity (ERN) signal, a P200 signal, a P600 signal, and an N200 signal.

32. A method comprising:
generating a plurality of stimuli from a plurality of symbols, wherein the plurality of symbols comprises an attended-to symbol;
generating a signal indicative of brain activity while generating the plurality of stimuli, wherein the signal indicative of brain activity includes a first portion indicative of brain activity responsive to stimulus, and wherein the signal indicative of brain activity further includes a second portion substantially independent of response to stimulus;
processing the signal indicative of brain activity to generate a processed signal, wherein processing the signal indicative of brain activity comprises increasing the relative magnitude of the first portion with respect to the second portion;
determining the attended-to symbol based on the processed signal;
generating a display of N symbols;
highlighting a plurality of the N symbols;
determining the attended-to symbol based on the processed signal; and
highlighting a different plurality of the N symbols based on the determining the attended-to symbol.

33. The method of claim 32, further comprising generating a display of N symbols, where N is greater than eighty.

34. The method of claim 33, wherein N is between eighty and two hundred.

35. A method comprising:
generating one or more stimuli to a person;
generating a visual display of one or more symbols to be viewed by the person as the one or more stimuli, wherein generating the visual display of the one or more symbols comprises displaying a portion of the one or more symbols on a periphery of the visual display;
generating at least one signal indicative of brain activity of the person who receives the one or more stimuli, wherein the signal indicative of brain activity includes a first portion indicative of brain activity responsive to the one or more stimuli, and a second portion substantially independent of a response to the one or more stimuli;
processing the signal indicative of brain activity to generate a processed signal, wherein processing the signal indicative of brain activity comprises comparing a relative magnitude of the first portion with respect to the second portion;
determining whether the person attends to or ignores the one or more stimuli based on the processed signal by comparing the first portion to the second portion; and
determining which of the one or more symbols have a higher probability of being attended-to, and selectively positioning symbols with a higher probability of being attended-to on the periphery of the visual display.

36. The method of claim 35, wherein, the one or more stimuli are highlighted symbols and are selected from a pool of symbols.

37. The method of claim 35, wherein generating the one or more stimuli comprises highlighting a first plurality of the one or more symbols at a first time, and highlighting a second different plurality of the one or more symbols at a second time.

* * * * *

UNITED STATES PATENT AND TRADEMARK OFFICE
CERTIFICATE OF CORRECTION

| | | |
|---|---|---|
| PATENT NO. | : 7,546,158 B2 | Page 1 of 1 |
| APPLICATION NO. | : 10/863587 | |
| DATED | : June 9, 2009 | |
| INVENTOR(S) | : Brendan Z. Allison and Jaime A. Pineda | |

It is certified that error appears in the above-identified patent and that said Letters Patent is hereby corrected as shown below:

Column 16, line 36 (Claim 29), delete "comprising" and insert --comprises--.

Signed and Sealed this

Eleventh Day of August, 2009

David J. Kappos
*Director of the United States Patent and Trademark Office*